Jan. 8, 1963

V. E. PRATT 3,072,013

MICROFILM READER

Filed July 30, 1959

INVENTOR.
VERNEUR E. PRATT
BY
ATTORNEYS.

Jan. 8, 1963

V. E. PRATT 3,072,013

MICROFILM READER

Filed July 30, 1959

INVENTOR.
VERNEUR E. PRATT
BY
Christie, Parker & Hale
ATTORNEYS.

Jan. 8, 1963

V. E. PRATT 3,072,013

MICROFILM READER

Filed July 30, 1959

INVENTOR.
VERNEUR E. PRATT
BY Christie, Parker & Hale
ATTORNEYS

Jan. 8, 1963 V. E. PRATT 3,072,013
MICROFILM READER
Filed July 30, 1959 6 Sheets-Sheet 5

INVENTOR.
VERNEUR E. PRATT
BY
*Christie, Parker & Hale*
ATTORNEYS

Jan. 8, 1963 V. E. PRATT 3,072,013
MICROFILM READER
Filed July 30, 1959 6 Sheets-Sheet 6

INVENTOR.
VERNEUR E. PRATT
BY Christie, Parker & Hale
ATTORNEYS 3,072,013
MICROFILM READER
Verneur E. Pratt, Fullerton, Calif., assignor to General Telephone Directory Company, a corporation of Delaware
Filed July 30, 1959, Ser. No. 830,503
8 Claims. (Cl. 88—24)

This invention relates to microfilming and more particularly to microfilm readers or viewers for microfilmed directories, catalogues, and the like capable of continually presenting the microfilm data suitable for reading and observation during the searching of the desired portions of the microfilmed data.

More and more printed matter is appearing in directories, catalogues, and similar forms wherein names, addresses, occupations, telephone numbers, services offered, etc., of a particular group of persons or organizations are listed. Some of this information is repeatedly used and even in daily usage requires that the directory material be current. This directory material is continually subject to change as the group of persons or organizations classified therein increases, decreases or changes location. These changes make it necessary to periodically print new directories or catalogues to maintain them current and usable. With the continued increase in printing costs, the cost of these directories become an important factor in a business operation. A common example of a constantly changing directory is the telephone directory presently provided by the telephone companies in book form. In addition to periodically reissuing the telephone books to keep the telephone information current, the changes occurring between issues of telephone books are handled by means of telephone operators commonly known as "information operators." These operators provide the information not listed in the current directories and a significant number of such "information" calls are a result of seeking the same information which was previously obtained from an operator and not recorded for future use. Due to the frequency with which this "information" service is rendered it also has become a substantial factor in the total cost of maintaining the telephone directory information current.

The cost of maintaining these directories can be substantially reduced if the directory material in the case of telephone subscribers, can be arranged on microfilm along with an inexpensive microfilm reader or viewer that can be provided with the telephone instrument in lieu of telephone books. In order to be economically justifiable, a microfilm reader that can be distributed to the subscribers of a directory must be capable of being manufactured in very large volume at a low unit cost. The cost of microfilming this directory material and the cost of the microfilm reader must represent a savings over that required for printing the directories and the cost attributed to the telephone "information" operators. The same cost requirements must be considered when other catalogues or directory material is to be handled by these microfilming techniques. The provision of an inexpensive microfilm reader will allow the originator or publisher of the directory to maintain the directories current by simply mailing the current microfilm card to the subscribers. In the case of the telephone directories for example, the changes in the directories may be mailed to the subscriber approximately once a month thereby maintaining the changes to a minimum and allowing a reduction or complete elimination of the telephone "information operators." This procedure will substantially reduce the cost of maintaining telephone directories.

The cost requirements of a microfilm directory require that the directory information be reduced to a size whereby only a small portion of the microfilmed record can be read or viewed at one time. Directory material, on the other hand, is generally arranged in accordance with some classification, alphabetical, numerical, geographical, professional, etc. This generally requires that the desired information be searched out in accordance with a particular class and sub-class. The searching procedure required for a directory type microfilm reader necessarily entails relative movement between the lens system of the microfilm reader and the microfilm card consistent with the class and subclass of the microfilmed directory material. Accordingly, this necessitates that the images derived from the microfilmed material be continuously maintained in sharp focus to allow the searching out of the desired information. This maintenance of a sharp focus has not been a problem with prior art microfilm readers since the microfilmed information and the reader therefor were so proportioned and arranged that a complete microfilm unit or an intelligible portion thereof could be presented on the viewing screen and the focusing of the microfilmed images could be manually controlled by the microfilm operator during the searching procedure. To eliminate the use of complicated spindles and threading or guiding mechanisms and the long searching time required when a roll of film is used, the directory material may be arranged on a flat microfilm card. The flat microfilm card must be tightly held to maintain the relative alignment of the data on the microfilm card with the lens system to maintain an image of a reasonably sharp focus on the viewing screen. This latter feature is necessary to enable rapid searching.

This invention provides an inexpensive, portable microfilm reader capable of high volume production for use with microfilmed directories, catalogues, lists and the like. The microfilm reader can be used in a lighted room with pleasure and provides a speedy searching procedure for locating a desired portion of directory information. The reader is handy and readily positioned adjacent the telephone instrument, and yet unbreakable, allowing it to be serviced by the user or telephone subscriber.

In one embodiment of the invention the microfilm reader includes a housing for an optical system arranged to condense the light rays from an energizable light source. The light rays are transmitted through a microfilm record unit which is a flat microfilm unit onto a projection optical system including a short focal length lens. The microfilmed unit is maintained optically flat by means of a pair of transparent pressure plates arranged on a movable carrier intermediate the condensing and projection systems. The short focal length lens is defined to be continuously in focus between it nodal point and the emulsion of the microfilm to allow the images to be read while a particular image thereon is being searched out. The movable carrier is operatively connected with control means to provide a searching movement thereof to allow the selection of a desired column and a particular portion of the desired column to be located on the microrecord unit. The projection system includes a viewing lens integral with a movable top cover for the microfilm reader and which cover may be pivoted so as to be slidable into the housing for storage purposes and out of the housing to selectively display the viewing lens for reading.

In the above embodiment of the invention the projection lens is maintained in a fixed position relative to the microfilm holder while in another embodiment the projection lens may be mounted by means of gimbals to constantly engage the top surface of one of the transparent pressure plates provided for holding the microrecord. The lens arranged to be "floating" in this manner is also in continuous focus with the microfilm images throughout the searching procedure.

These and other features of the present invention may be more fully appreciated when considered in the light of the following specification and drawings, in which.

Now referring to the drawings, an embodiment of the invention for reading microfilmed telephone directory material will be described. The microfilm reader 10 will be seen to include a housing 12 enclosing a light condensing system 14 arranged on one side of a microfilm holder 16 with a short focus projection lens system 18 on the opposite side thereof arranged in constant focus while searching the microrecord. The light projection system 18 includes a viewing element 20 mounted on a top cover 22 for the housing 12 and adapted to be positioned within the housing for storage purposes when the reader is not in use and to selectively display the viewing element 20 for reading the microrecord. The microfilm holder 16 is adapted to receive a flat microfilm record unit or card 24 and is mounted on a movable carriage 26. The movable carriage 26 is provided with control means operatively connected thereto to move the holder 16 and thereby the microfilm unit 24 in a scanning or searching movement while reading the images on the viewing screen to allow the selection of a desired column or class of information and a particular portion of the desired column or subclass of this information on the microrecord.

Figures 2, 3:
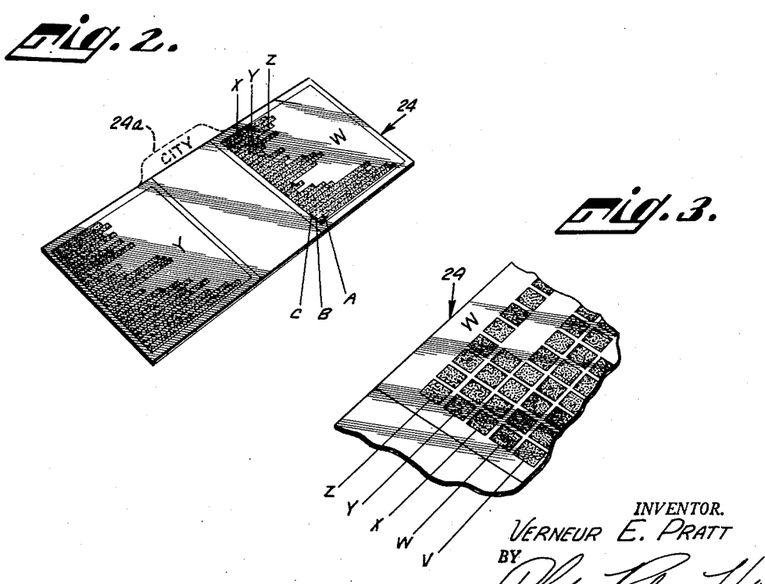
FIG. 2 is a top-plan view of a typical microfilm record unit.
FIG. 3 is an enlarged portion of the microfilm unit of FIG. 2.

Before describing the microfilm reader 10 in more detail, the format for a typical microfilm record unit or card will be examined. The microfilm record unit 24, as illustrated in FIGS. 2 and 3, contains all of the directory material for a typical small town microrecorded thereon. The microfilm record unit or card 24 contains the microfilmed "yellow" pages, further identified by the reference letter Y, on the left hand side of the unit as illustrated in FIG. 2, while the "white" pages or alphabetical classification of the telephone subscribers is shown at the opposite or right hand end and further identified by the reference letter W. The alphabetical classification of the telephone subscribers for the white pages, W, is arranged to run in alphabetical order transversely of the record unit 24. Specifically, the subscribers having surnames or last names beginning with A are recorded in the first column adjacent the lower left hand corner of section W, with the subscribers having surnames beginning with B recorded in the column adjacent thereto, and the next column containing the C's, etc., until the Z's are reached at the upper right hand corner of the area W. It will be appreciated that each column of classification further includes the subclasses or the further alphabetical classification of the surnames beginning with the same letter, as per conventional directory practice. Accordingly, in order to search out any particular telephone subscriber on the record unit 24 the same search procedure is used as when a telephone book is provided, namely scanning for the correct column and then moving down the column until the particular subscriber is located. In this same fashion the "yellow" pages, Y, may be searched and which pages may be microfilmed in accordance with the alphabetical classification of the services offered and the sub-classes within these services.

When the entire telephone directory may not be recorded on a single record unit, or record units for more than one locality are provided for the telephone subscribers, the record units 24 may be provided with a tab, similar to the tab 24ᵃ, identifying the locality or subclass of a particular locality that is recorded on the microfilm unit. When a plurality of microfilm units 24 are provided they may be stored with the microfilm reader 10 through the provision of a pocket, similar to the one identified by the reference number 28, constructed and arranged on one or both side walls of the housing 12 and integral therewith; see FIG. 1.

The housing 12 is preferably constructed of a light weight, unbreakable material providing a portable and lightproof enclosure. The housing 12 includes a base member 29 enclosed by the bottom wall 30 for supporting the light condensing system 14. The base member 29 is of a length to space the front and rear upright guide rails 31 and 33 respectively and with members for defining a front wall 32, a back wall 34 and the two side walls 36 and 38 provide a compartment for the light condensing system 14. The front and rear walls 32 and 34 extend outwardly of the guide rails 31 and 33 to define a compartment with a longitudinally extending bracket 39 for the microfilm holder 16. The front wall member 32 is considered to extend upwardly of the microfilm holder compartment to define a front face extending angularly inwardly. This front face is defined to slidably receive the top cover 22 which is hinged to the rear wall 34. The front wall member 32 is provided with a pull knob 35 to allow the adjacent wall portion to be extended outwardly to allow movement of the cover 22 into and out of the housing proper. To this end locking means may be provided for securing the cover 22 in its extended position.

The bottom wall member 30 is provided with a pair of spaced feet or pedestals, of the type identified by the reference number 37, connected thereto immediately below the guide rails 31 and adjacent the opposite ends thereof. The feet 37 are provided only at the front end of the reader 10 to cause the viewing screen 20 to be tilted so that the viewer can read the entire image appearing thereon comfortably.

Figure 4:
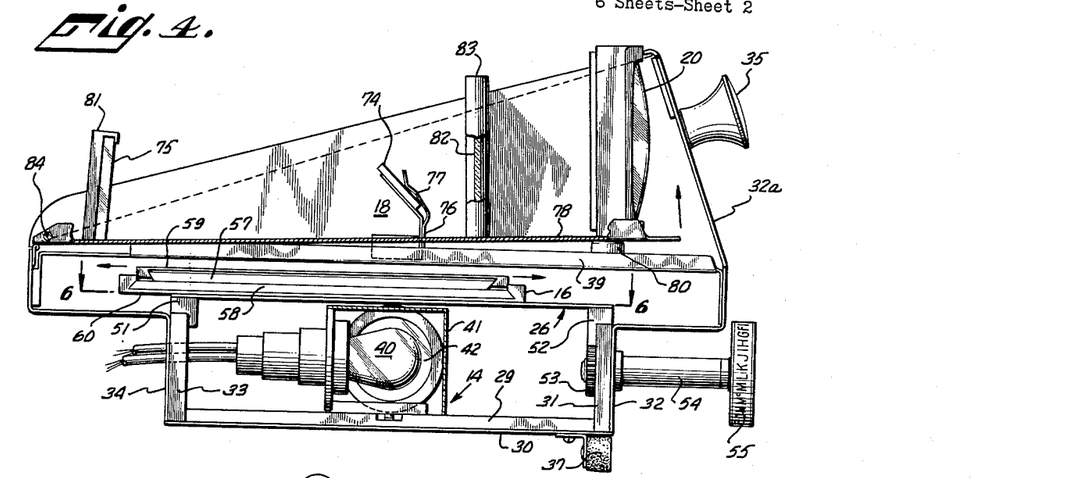
FIG. 4 is a side elevational view with portions in section of the microfilm reader of FIG. 2 with the top cover and side panel removed.
Figure 11:
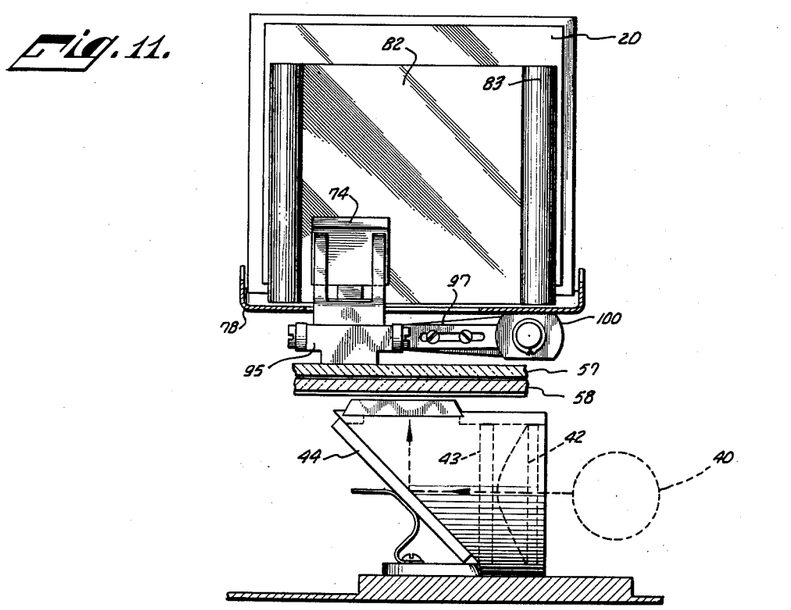
FIG. 11 is a partial sectional view of a modified arrangement for the projection lens shown in a storage position.
Figure 12:
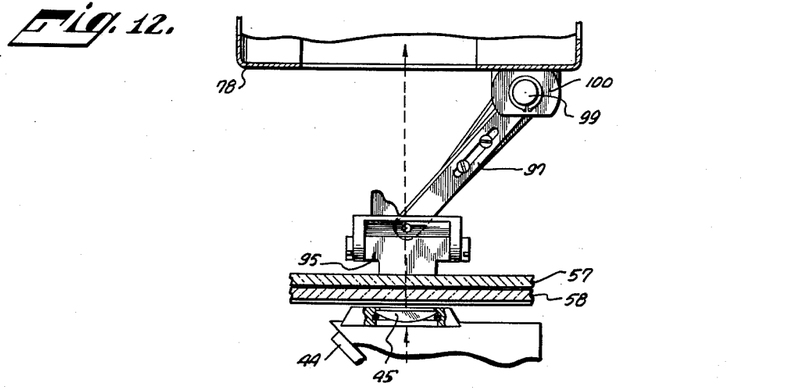
FIG. 12 is a partial sectional view of the embodiment of FIG. 11 with the projection lens shown in operating position.
Figure 13:
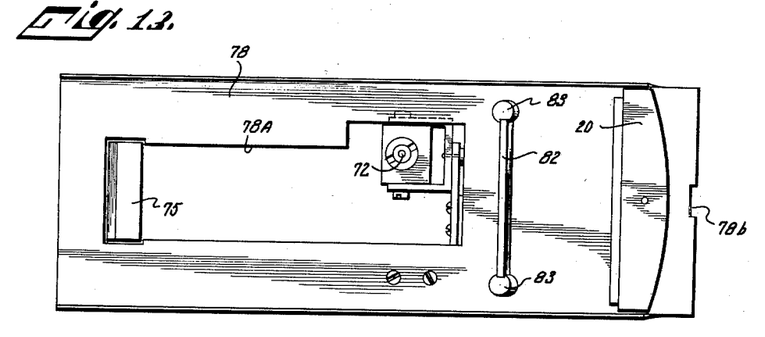
FIG. 13 is a top-plan view of the projection optical arrangement with the projection lens shown in a storage position.
Figure 14:
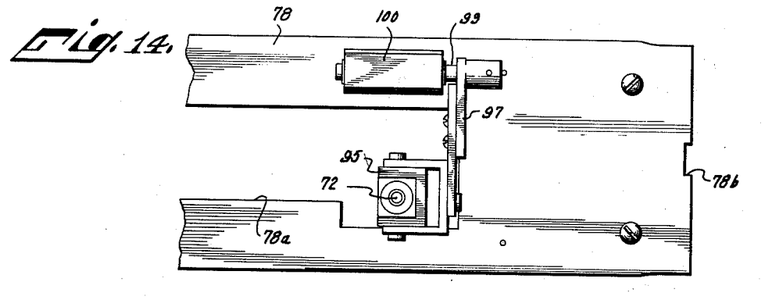
FIG. 14 is a partial bottom-plan view of the arrangement of FIG. 13.
Figure 15:
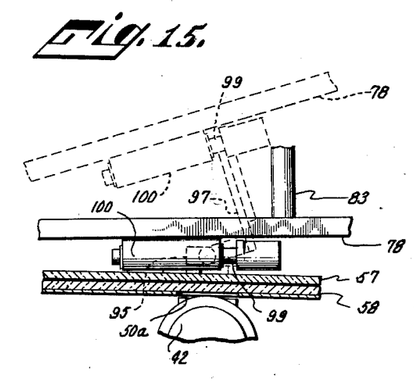
FIG. 15 is a partial sectional and elevational view of the projection lens shown in a storage position and shown in an operating position in dotted outline.
Figure 16:
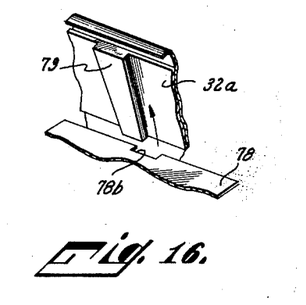
FIG. 16 is a fragmentary view of a locking arrangement for the top cover.

The light condensing system 14 includes a lamp 40 preselected consistent with the best of microfilm reader requirements and enclosed in a light shield 41 and which light shield is apertured to allow the light rays from the lamp 40 to strike an aspheric condensing lens 42 mounted adjacent thereto; as best seen in FIG. 4. The light rays derived from the condensing lens 42 are successively passed through a heat glass 43 and onto a reflecting or mirror surface 44; see FIGS. 11 and 12. The mirror 44 is angularly positioned to reflect the condensed light rays from the lamp 40 to the microfilm holder 16 by means of a plano-convex condenser lens 45 mounted immediately below the holder 16.

The lamp 40 is secured to a suitable electrical socket allowing the lamp to be simply removed and replaced. The socket may be electrically connected to a step-down transformer (not shown) arranged within the housing 12 for energizing the lamp from a wall socket by means of the plug 46. It may be found convenient in certain applications wherein an alternating current socket is not arranged near the telephone instrument or where alternating current is not available, to connect the lamp 40 to a plurality of series connected dry cells or batteries. When powered by batteries, they may be stored in the compartment provided for the light condensing system 14 in lieu of the transformer. The lamp and dry cells or transformer are readily accessible to the operator since the side wall member 36 is provided with a hinge (not shown) to allow the member 36 to be swung outwardly.

Figures 7, 8:
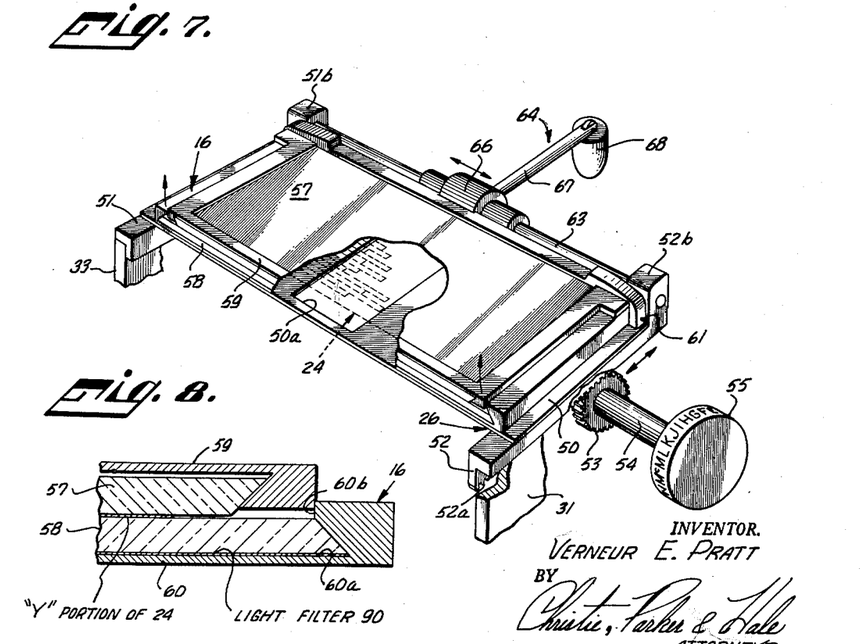
FIG. 7 is a perspective view, with portions broken away, of the detached microfilm holder and carriage.
FIG. 8 is an enlarged, partial cross-sectional view of the microfilm holder.
Figure 9:
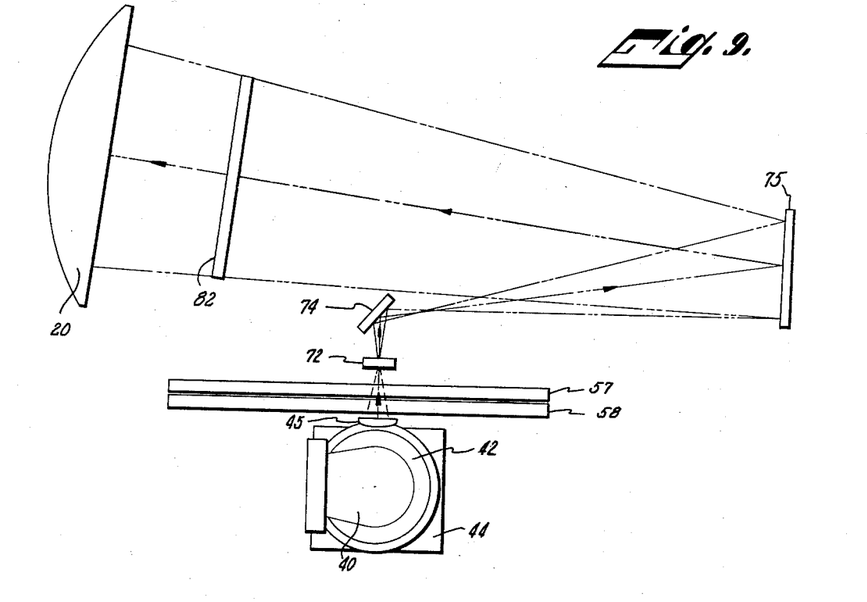
FIG. 9 is a schematic representation of the complete optical layout for the microfilm reader.

The movable carriage 26 comprises a horizontal platform 50 mounted on the guide members 51 and 52 arranged integrally with and at opposite ends thereof, see FIG. 7, for example. The guide rails 51 and 52 are channel shaped and defined to be slidably received along the cooperating ways of the guide rails 31 and 33 respectively. The guide rail 52 has its bottom edge toothed, as identified by the reference numeral 52$^a$, to mesh with a gear 53 in the fashion of a rack and pinion. The gear 53 is mounted on a suitably journaled rotatable control shaft 54 provided in the guide rail 31 and front wall member 32 and extending outwardly of the housing 12. The free end of the control shaft 54 may be provided with a control wheel 55 connected for rotating the control shaft 54 and arranged to be readily accessible to the user or operator of the reader 10. The control wheel 55 may be in the form of a wheel having its peripheral or circumferential surface marked in accordance with the classification of the microfilmed material to facilitate the searching of information. In the case of the microfilmed telephone directories, these markings would be the letters of the alphabet whereby the first letter of the surname of the telephone subscriber may be located by rotating the control wheel 55 to that particular letter.

The movable carriage 26 mounts a microfilm holder 16 on the platform 50. The holder 16 comprises a pair of transparent pressure plates 57 and 58 secured to the respective hinged frame members 59 and 60 and adapted to tightly press a microfilm record unit 24 therebetween. The pressure plates 57 and 58 may comprise glass plates having preselected optical and dimensional properties as will be made more evident hereinafter. The holder 60 is defined as a frame for the pressure plate 58 and which pressure plate is held by the holder 60 through the provision of an internally defined V-shaped channel 60$^a$, as best seen in FIG. 8. The pressure plate 58 is provided with its corresponding edges chamfered to be received and secured by the V-shaped channel 60$^a$. The holder 59 is of a length to be received within the inside top parallel edges 60$^b$ of the holder 60 and is also provided with an internally defined V-shaped channel to receive a corresponding chamfered edge of the pressure plate 57. The holder 59 is of a thickness less than the thickness of the pressure plate 57 to allow the latter to contact the bottom pressure plate 58 whereby a microfilm record unit 24 is tightly held therebetween regardless of the movement imparted to the holder 16. To this end the platform 50 is provided with a rectangular opening 50$^a$ to expose the selected area of the microfilm record unit 24 to the light rays derived from the condensing lens 45. Any heat generated by the lamp 40 is dissipated by the plates 57 and 58 and the holders 59 and 60. This arrangement acts to spread the heat substantially evenly over the entire microrecord 24 and prevents the "buckling" thereof at any one spot.

Figure 1:
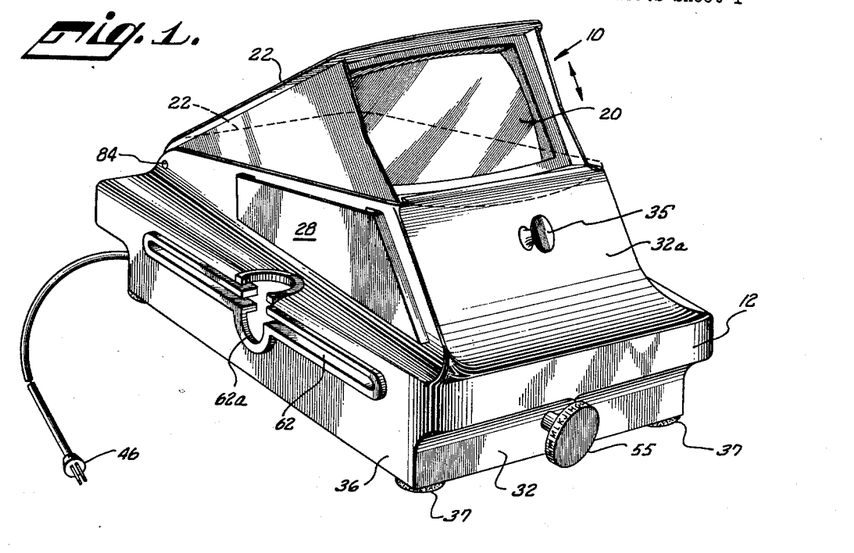
FIG. 1 is a perspective view of the microfilm reader embodying the invention showing the closed position of the cover in dotted outline.

The microfilm record unit 24 may be inserted between the pressure plates 57 and 58 by means of a longitudinally extending slot 62 arranged in the side wall member 36 (see FIG. 1). The length of the slot 62 is defined relative to the length of a microrecord 24 to allow it to be easily slipped therethrough. The slot 62 is arranged opposite the pair of pressure plates 57 and 58 whereby the microrecord 24 is positioned therebetween. The holder 59 is adapted to be responsive to the insertion of the microrecord 24 between the plates 57 and 58 through the provision of a hinged connection including a hinge pin 61 whereby the plates 57 and 58 are separated to receive the microrecord. The slot 62 is also defined approximately centrally thereof by means of a transverse aperture 62$^a$ defined to accommodate the operator's thumb and forefinger for inserting and withdrawing the microrecord 25 into the reader 10.

The guide members 51 and 52 are further arranged with upright posts 51$^b$ and 52$^b$, respectively arranged at the right hand ends thereof, as shown in FIG. 7, for receiving a guide rod 63 mounted therebetween. The guide rod 63 mounts a control member 64 having a slidable operating member 66 mounted on the guide rod 63 in a telescoped relationship. The control member 64 further includes a control arm 67 extending outwardly of the operating member 66 and outwardly of the housing 12 by means of a longitudinally extending slot 38$^a$ provided for the side wall member 38. The control arm 67 mounts a control knob 68 at the exposed end to facilitate movement of the control member 64. The operating member 66 is rigidly connected with the holder 16 so the latter is movable therewith. A force applied transversely to the longitudinal axis of the control arm 67 will cause the operating member 66 to slide along the guide rod 63 and also the holder 16 to slide on the platform 50. This action will now be seen to allow searching of the particular column selected by operation of the control wheel 55.

It should be noted at this point that the control member 64 may be used as a single control member for the reader 10, in which case the control shaft 54 and control wheel 55 may be eliminated. The functions of the control shaft 54 may be performed by applying a pushing force longitudinally of the control arm 67 whereby the guide member 52 rotates the gear wheel 53, which may be mounted on a stub shaft under these operating conditions, to position the movable carriage 26 transversely. In addition, when the magnification is very high, the handle 68 can be omitted and the control wheel 55 may be utilized in combination with a rack and pinion arrangement controlled by a rotatable control wheel.

Figure 5:
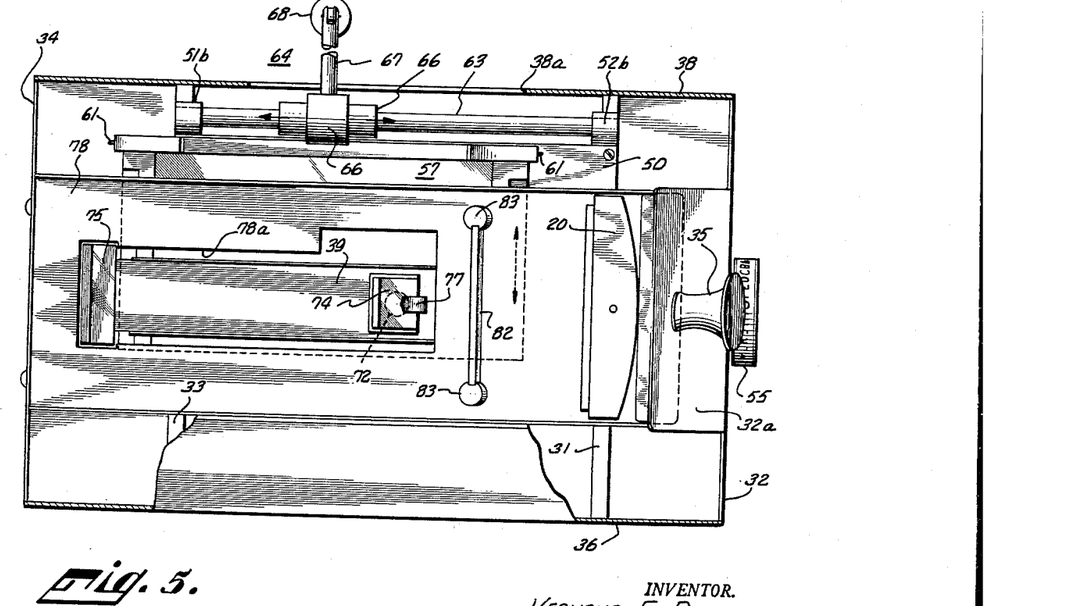
FIG. 5 is a plan view of the microfilm reader as shown in FIG. 4.
Figure 6:
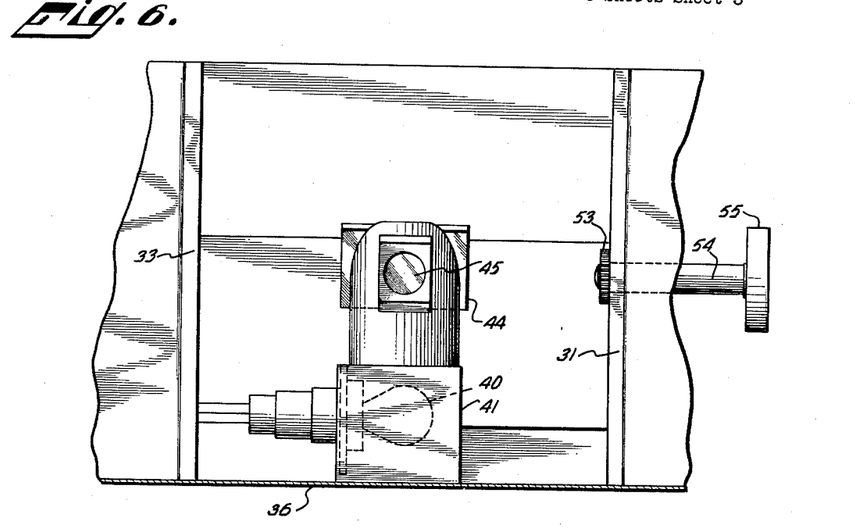
FIG. 6 is a sectional view taken along the lines 6—6 of FIG. 4.

Above the holder 16 there is provided a bracket 39 mounting a short focus projection lens 72; see FIGS. 4 and 5, for example. The projection lens 72 is arranged on the bracket 39 above the aperture 50$^a$ in optical alignment with the condensing lens 45 to receive the light image derived from the microfilm record unit 24. The projection lens 72 is in this fashion arranged in a fixed position relative to the holder 16 which may be moved longitudinally and transversely thereof as described hereinabove. The bracket 39 further mounts a light reflecting surface or mirror 74 to receive the light rays from the projection lens 72 and to reflect them to a reflecting surface or mirror 75 arranged at the opposite end of the housing 12 from the viewing element 20 through a suitably dimensioned aperture 78$^a$ for the bracket 78. The mirror 74 is mounted on a carrier 76 and is held thereon by means of a spring clip 77 at an inclined relationship relative to the lens 72 to provide the desired angle of reflection for bending the light rays towards the mirror 75. The mirror 75 is in turn mounted on a bracket 78 integral with the top cover 22 and forming a base therefor. The bracket 78 rests on posts, similar to the post 80 provided on the bracket 39 when the top cover 22 is in a storage position. The bracket 78 is provided with a centrally located notch 78$^b$ at its forward end and defined to cooperate with a V-shaped guide 79 mounted on the inside surface of the wall portion 32$^a$ to slidably receive the bracket 78 thereon and to lock the viewing element 20 in a stable position for viewing.

The mirror 75 is mounted by a holder 81 at an angular position slightly inwardly of the vertical to compensate for the tilted relationship of the viewing element 20. The bracket 78 further mounts the viewing screen 82 arranged forwardly of the mirror 75 and the mirror 74 and inwardly of the viewing element 20. The viewing screen 82 is mounted between a pair of spaced mounting posts identified by the reference number 83 while the viewing element 20 is secured to the top cover 22. The top cover 22 mounts the viewing element 20 inwardly of the light exposed end thereof whereby the element 20 is protected against stray light incident thereon. The viewing element 20 may also provide magnification of the microfilmed images. The top cover 22 including the bracket 78 is pivoted adjacent the rear end thereof as indicated by the pivot pin 84, whereby the cover may be slidably received and stored in the housing 12 or selectively raised and locked into position to display the viewing element 20.

It has also been found that where the environmental light is at a high level, the viewing lens 20 may be omitted and the viewing screen 82 located in the position of the lens 20 to serve as the viewing element.

The projection lens 72 is a highly corrected projection lens with a very short equivalent focal length of between 4–10 millimeters. The projection lens 72, as indicated hereinabove, is arranged to be in constant focus with the microfilmed images during searching of the record unit 24. To maintain a reasonably sharp focus of the microfilmed images regardless of the curvature of the film the pressure plates 57 and 58 must have a thickness within preselected limits. To this end the top plate 57 is defined to have a thickness variation less than the rear focal length tolerance of the projection lens 72 whereby the lens maintains focus between its nodal point and the emulsion of the microfilm. If this relationship is maintained, the bottom plate 58 may be of any thickness. Accordingly, for the projection lens under consideration the thickness tolerance should be less than plus or minus .003 inch while the flatness from end to end and side to side may not be more than .003 inch per inch.

With the above structure in mind the operation of the microfilm reader 10 for searching out a telephone subscriber's number can be examined in more detail. When it is desired to use the reader 10 to find a telephone number of a particular subscriber, such as John Caesar, the correct microfilm record unit 24 is selected. The selected unit 24 is slipped through the slot 62 and between the pressure plates 57 and 58 until it seats against the rear wall of the holder 16. At this time the unit 24 may be accessible to the operator at the aperture 62ª by means of the tab 24ª. Assuming the plug 46 is connected to a wall socket, the light source may then be energized by closing a switch (not shown) connected between the plug 46 and the lamp 40 in conventional fashion. This will illuminate the microfilm record unit 24 and the image derived therefrom will be an enlarged focused image appearing on the viewing element 20 by means of the light rays projected from the lens 72 and reflected from the mirrors 74 and 75 onto the viewing screen 82. Assuming the carriage has not been previously set to the C column to find Caesar, John, the control wheel 55 is rotated to the "C" position. The operation of the control wheel 55 rotates the gear 53 and accordingly the guide rails 51 and 52 move transversely of the reader to position the "C" column in longitudinal alignment to be scanned by the projection lens 72. The operation of the control member 64 will then slide the holder 16 longitudinally of the reader while the operator is viewing the subscribers names as they appear in alphabetical order in the "C" column on the viewing element 20. Upon reaching the desired John Caesar the operator can read off the telephone number and place his telephone call. Prior to placing the call or immediately thereafter, the operator should operate the light switch to de-energize the lamp 40 to protect the life thereof.

Figure 10:
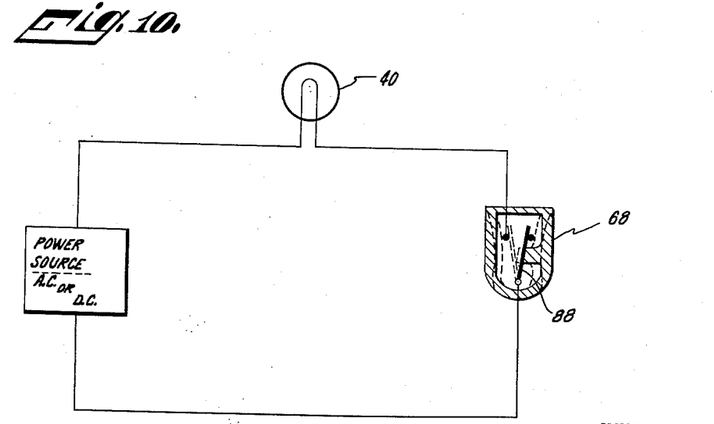
FIG. 10 is a schematic circuit diagram of the lamp circuit.

As indicated hereinabove, the searching operation can be accomplished solely by controlling the position of the member 64 and which control member may also be advantageously utilized to control the energization and de-energization of the lamp 40. This important feature of the invention saves the life of the lamp 40 and the batteries, when they are used to energize the lamp. For this purpose the control knob 68 may be of a resilient material so as to be responsive to the slightest amount of pressure applied by the fingers of the microfilm operator. A pressure sensitive switch 88 is incorporated in the control knob 68 and which switch is normally arranged to be in an open circuit condition as illustrated in FIG. 10. The grasping by the operator of the control member 64 at the knob 68 will provide the necessary pressure to close the switch 88 and thereby illuminate the microfilm record unit 24. The searching procedure may then continue in the normal fashion while the knob 68 is held by the operator to maintain the lamp energized throughout this interval. Upon locating the desired subscriber and noting the telephone number thereof, the release of the control knob 68 will allow the switch 88 to open the circuit to the lamp 40 and de-energize same. It will now be recognized that this expedient will protect the lamp 40 and batteries from remaining energized for long periods when the reader 10 is not in use and yet allow the reader to be operated in a normal, simple, foolproof fashion.

A feature of the invention to be considered when a microfilmed telephone directory is desired is the long usage of printing the classified directory information on yellow pages. It is therefore highly desirable to present this information in the same color as in the past rather than in black and white as the subscriber's directory is presented. This problem is simply solved by this invention through the provision of a light filter 90 arranged to color the light rays illuminating the microrecord unit 24, in the case of a telephone directory a yellow filter is used. By merely coloring the light rays in this fashion, the image derived from the unit 24 is unaffected. In addition this has advantages over the obvious expedient of recording the classified information on a colored background, and which results in color recording problems and expense every time a unit 24 is updated. The coloring of the light from the lamp 40 and which lamp provides a substantially white light is effected by arranging the light filter 90 below the bottom pressure plate 58 to be secured by the holder 60 whereby it is spaced intermediate the light source and the entire portion of the microrecord 24 identified as the "Y" portion only. It will now be recognized that the "W" portion will be illuminated by white light while the "Y" portion will be illuminated by yellow light.

Now referring to FIGS. 11–15, another embodiment of the microfilm reader 10 will be described. This particular embodiment is substantially similar to that previously described except for mounting the projection lens 72 as a "floating" lens.

The bracket 39 for mounting the projection lens 72 has been eliminated and instead the lens has been suspended from the bottom bracket 78 integral with the top cover 22. The projection lens 72 is mounted and suspended from the bracket 78 to allow it to glide over the surface of the top pressure plate 57 thereby maintaining constant contact with this surface. The projection lens 72 may be mounted in a block 95 (see FIGS. 13 and 14) which may be a plastic or metal block and which block further mounts the reflecting surface or mirror 74 (FIG. 11) to reflect the light rays from the projection lens 72 to the rear mirror 75, as discussed hereinabove for the previous embodiment. The block 95 is pivotally connected and suspended to the end of a mounting arm 97 and which arm is connected to be rotatable with a shaft 99. The shaft 99 is suitably journaled by means of bearings arranged in the cylindrical housing 100. The housing 100 is connected to the bottom of the bracket 78. This "floating" lens construction is responsive to the movement of top cover 22 to assume a collapsed position for storage and an optically aligned position with the condensing lens 45 for reading. The collapsed position of the lens is shown in FIGS. 11, 13–15 and in dotted outline in FIG. 15 while the operating position is shown in solid lines in this same figure.

The optical properties for the pressure plates 57 and 58 are substantially the same as described for the previous embodiment. The projection lens 72 is maintained in constant focus with the microrecorded images and in particular the "floating" of the lens over the pressure plate 57 maintains the focus between its nodal point and the emulsion of the microfilm. The "floating" action of the lens 72 results from operating the control wheel 55 and control member 64.

It will now be seen that an improved, portable, inexpensive reader for microrecorded directories has been provided and which reader readily lends itself to mass production at a cost allowing it to be substituted for the presently printed directories. The microfilm reader is of such a construction that the servicing can be performed by the ordinary subscriber since the lamp and possibly only the dry cells where A.C. current is not available need to be replaced occasionally.

What is claimed is:

1. A portable microfilm reader for reading flat microrecord cards including a lightproof housing having a movable cover mounting a viewing element adapted to be stored within the housing proper and to be withdrawn for displaying the viewing element when a microrecord card is to be read, said cover further mounting a light reflecting element spaced from said viewing element for reflecting light rays directed thereto to said viewing element, said housing further including an opening to allow a microrecord card to be inserted into the housing, a pair of transparent plates having edges aligned with said opening and adapted to hold a microrecord card therebetween in an optically flat position without external pressure and yet are separable in response to the pressure exerted by a card positioned in said opening to allow the card to be slipped between the plates for reading, a light source including a light condensing system arranged within said housing on one side of said pair of transparent plates, a projection lens system arranged on the opposite side of said plates from said condensing system to receive the light images from a microrecord card held by the plates, said projection lens system being defined to maintain reasonably sharp focus with the microrecord images at any selected position of the plates and projecting the images onto the light reflecting element mounted on the cover to allow the continuous searching of a microrecord card without auxiliary focusing when the cover is withdrawn, said projection lens system comprising a projection lens having a preselected focal length mounted in a preselected spaced relationship with a microrecord held by said plates for receiving the light rays transmitted through said pair of plates, another light reflecting element mounted adjacent said projection lens for receiving and reflecting the light images of the microrecord to said first mentioned light reflecting element, said plates being movable as a unit and being defined and constructed to continuously maintain the microrecorded images in optical alignment with the projection lens, at least the holding plate arranged adjacent the light projecting system having a controlled thickness defined relative to the focal length of said system to maintain the microrecord in continuous focus, and control means connected with said movable plates for operating same through a searching movement while reading the images on the viewing element to thereby allow the card to be searched for selecting a particular portion of the microrecord card for reading.

2. A portable microfilm reader for reading flat microrecord cards as defined in claim 1 wherein the projection lens has a focal length on the order of four to ten millimeters.

3. A portable microfilm reader for reading flat microrecord cards including a lightproof housing having a movable cover mounting a viewing element adapted to be stored within the housing proper and to be withdrawn for displaying the viewing element when a microrecord card is to be read, said cover further mounting a light reflecting element spaced from said viewing element for reflecting light rays directed thereto to said viewing element, said housing further including an opening to allow a microrecord card to be inserted into the housing, a pair of transparent plates having edges aligned with said opening and adapted to hold a microrecord card therebetween in an optically flat position without external pressure and yet are separable in response to the pressure exerted by a card positioned in said opening to allow the card to be slipped between the plates for reading, a light source including a light condensing system arranged within said housing on one side of said pair of transparent plates, a projection lens system arranged on the opposite side of said plates from said condensing system to receive the light images from a microrecord card held by the plates, said projection lens system being defined to maintain reasonably sharp focus with the microrecord images at any selected position of the plates and projecting the images onto the light reflecting element mounted on the cover to allow the continuous searching of a microrecord card without auxiliary focusing when the cover is withdrawn, said projection lens system comprising a projection lens having a preselected focal length, flexible means connected to said cover and including means for mounting the projection lens to allow it to glide over the holding plate adjacent to the projection system when the cover is withdrawn from storage for reading and adapted to assume a collapsed position when the cover is closed, another light reflecting element mounted adjacent the projection lens to be movable therewith for receiving and reflecting the light images of the microrecord to said first mentioned light reflecting element, said plates being movable as a unit and being defined and constructed to continuously maintain the microrecorded images in optical alignment with the projection lens, at least the holding plate arranged adjacent the light projecting system having a controlled thickness defined relative to the focal length of said system to maintain the microrecord in continuous focus, and control means connected with said movable plates for operating same through a searching movement while reading the images on the viewing element to thereby allow the card to be searched for selecting a particular portion of the microrecord card for reading.

4. A portable microfilm reader for reading flat microrecord cards including a lightproof housing having a movable cover mounting a viewing element adapted to be stored within the housing proper and to be withdrawn for displaying the viewing element when a microrecord card is to be read, said cover further mounting a light reflecting element spaced from said viewing element for reflecting light rays directed thereto to said viewing element, said housing further including an opening to allow a microrecord card to be inserted into the housing, a pair of transparent plates having edges aligned with said opening and adapted to hold a microrecord card therebetween in an optically flat position without external pressure and yet are separable in response to the pressure exerted by a card positioned in said opening to allow the card to be slipped between the plates for reading, a light source including a light condensing system arranged within said housing on one side of said pair of transparent plates, a projection lens system arranged on the opposite side of said plates from said condensing system to receive the light images from a microrecord card held by the plates, said projection lens system having a projection lens of a focal length on the order of four to ten millimeters mounted in a preselected spaced relationship with a microrecord held by said plates for maintaining reasonably sharp focus with the microrecord images at any selected position of the plates to allow the continuous searching of a microrecord card without auxiliary focusing when the cover is withdrawn, said projection lens system including another light reflecting element mounted adjacent said projection lens for receiving the light rays transmitted through said pair of plates and reflecting said light images of the microrecord to said first mentioned light reflecting element, said plates being movable as a unit and being defined and constructed to continuously maintain the microrecorded images in optical alignment with the projection lens, at least the holding plate arranged adjacent the light projecting system having a controlled thickness defined relative to the focal length of said system to maintain the microrecord in continuous focus, and control means connected with said movable plates for operating same through a searching movement while reading the images on the viewing screen to thereby allow the card to be searched for selecting a particular portion of the microrecord card for reading, said control means including a pressure sensitive switch connected to control the energization of the light source.

5. A portable microfilm directory reader for reading flat microrecord cards, the microrecord cards comprising directory information microrecorded on at least two separate portions, each of the portions on the microrecord cards having the directory information recorded in adjacent columns comprising preselected classes of information and subclasses of information within each column, said directory reader comprising a lightproof housing having a movable cover mounting a viewing element adapted to be stored within the housing proper and to be withdrawn for displaying the viewing element when a microrecord card is to be read, said cover further mounting a light reflecting element spaced from said viewing element for reflecting light rays directed thereto to said viewing element, said housing further including an opening to allow a microrecord card to be inserted into the housing, a pair of transparent plates having edges aligned with said opening and adapted to hold a microrecord card therebetween in an optically flat position without external pressure and yet are separable in response to the pressure exerted by a card to allow the card to be slipped between the plates for reading, a light source including light condensing system arranged within said housing on one side of said pair of transparent plates, a projection lens system arranged on the opposite side of said plates from said condensing system to receive the light images from a microrecord card held by the plates, said projection lens system being defined to maintain reasonably sharp focus with the microrecord images at any selected position of the plates and projecting the images onto the exposed viewing element to allow the continuous searching of a microrecord card without auxiliary focusing, said projection lens system comprising a projection lens having a preselected focal length mounted in a preselected spaced relationship with a microrecord held by said plates for receiving the light rays transmitted through said plates, and another light reflecting element mounted adjacent said projection lens for receiving and reflecting the light images of the microrecord from the projection lens to said first mentioned light reflecting element, means accessible outside of the housing for moving said plates through two orthogonal axes as a unit and being defined and constructed to continuously maintain the microrecorded images in optical alignment with the projection lens, said means including a pressure sensitive switch connected to control the energization of the light source, at least the holding plate arranged adjacent the light projecting system having a controlled thickness defined relative to the focal length of said system to maintain the microrecord in continuous focus, the other of said plates including a light filter of a color different from the color of said light source arranged to be movable therewith and dimensionally defined to completely overlie one of the portions of a directory information recorded on the microrecord upon being placed into the path of the light from said source whereby the color of the light passing through said portion of the microrecord is changed, and control means connected with said movable plates for operating same through a searching movement while reading the images on the viewing element to thereby allow the card to be searched for selecting a particular column of the microrecord card for reading.

6. A portable microfilm directory reader for reading flat microrecord cards, the microrecord cards comprising the directory information microrecorded on at least two separate portions, each of the portions on the microrecord card having the directory information recorded in adjacent columns comprising preselected classes of information and subclasses of information within each column, said directory reader comprising a lightproof housing having a movable cover mounting a viewing element adapted to be stored within the housing proper and to be withdrawn for displaying the viewing element when a microrecord card is to be read, said cover further mounting a light reflecting element spaced from said viewing element for reflecting light rays directed thereto to said viewing element, said housing further including an opening to allow a microrecord card to be inserted into the housing, a pair of spaced guide rails within said housing, a pair of connected guide members movable over said guide rails, a pair of transparent plates having edges aligned with said opening and adapted to hold a microrecord card therebetween in an optically flat position without external pressure and yet are separable in response to the pressure exerted by a card to allow the card to be slipped between the plates for reading, said plates being mounted on said guide members and adapted to be moved while carrying the microrecord card in a fixed position relative thereto, a light source including a light condensing system arranged within said housing on one side of said pair of transparent plates, a projection lens system arranged on the opposite side of said plates from said condensing system to receive the light images from a microrecord card held by the plates, said projection lens system being defined to maintain reasonably sharp focus with the microrecorded images at any selected position of the plates and projecting the images onto the exposed viewing element to allow the continuous searching of a microrecord card without auxiliary focusing, said projection lens system comprising a projection lens having a preselected focal length mounted in a predetermined spaced relationship with the microrecord held by said plates for receiving the light rays transmitted through said plates, and another light reflecting element mounted adjacent said projection lens for receiving and reflecting the light images of the microrecord from the projection lens to said first mentioned light reflecting element, control means accessible outside of the housing for separately moving the guide members and the pressure plates through two orthogonal axes and being defined and constructed to continuously maintain the microrecorded images in optical alignment with the projection lens, said means including a pressure sensitive switch connected to control the energization of the light source, at least the holding plate arranged adjacent the light projecting system having a controlled thickness defined relative to the focal length of said system to maintain the microrecord in continuous focus, the other of said plates including a light filter of a color different from the color of said light source arranged to be moved therewith and dimensionally defined to completely overlie one of the portions of a directory information recorded on the microrecord upon being placed into the path of the light from said source whereby the color of the light passing through said portion of the microrecord is changed, and control means connected with said movable plates for operating same through a searching movement while reading the images on the veiwing element to thereby allow the card to be searched for selecting a particular column of the microrecord card for reading.

7. A portable microfilm directory reader for reading flat microrecord cards as defined in claim 6 wherein said housing is provided with a pocket for storing the microrecord cards to be read.

8. A portable microfilm directory reader as defined in claim 6 wherein the microrecord comprises telephone directory information corresponding to the alphabetical classification of telephone subscribers on one of the portions and the other portion of the microrecord corresponds to the classified telephone directory information, and including a light source of substantially white light and said light filter is a yellow filter to allow the alphabetical classification of subscribers to be viewed with the white light and the classified information to be viewed with a yellow light.

References Cited in the file of this patent

UNITED STATES PATENTS

| | | |
|---|---|---|
| 2,009,145 | Nathan | July 23, 1935 |
| 2,037,705 | Chapman | Apr. 21, 1936 |
| 2,322,023 | Hopkins | June 15, 1943 |
| 2,496,647 | Woodbury | Feb. 7, 1950 |
| 2,511,646 | Marmour | June 13, 1950 |
| 2,659,267 | Baule | Nov. 17, 1953 |
| 2,666,360 | Collins | Jan. 19, 1954 |
| 2,701,979 | Pratt et al. | Feb. 15, 1955 |

FOREIGN PATENTS

| | | |
|---|---|---|
| 510,347 | Great Britain | of 1939 |